G. E. HERRING

TARNISHPROOF CONTAINER

March 8, 1932.

Re. 18,379

Original Filed Jan. 10, 1929

INVENTOR.
George E. Herring

BY Lancaster and Allwine

ATTORNEYS.

Reissued Mar. 8, 1932

Re. 18,379

UNITED STATES PATENT OFFICE

GEORGE E. HERRING, OF CHICAGO, ILLINOIS

TARNISHPROOF CONTAINER

Original No. 1,791,594, dated February 10, 1931, Serial No. 331,523, filed January 10, 1929. Application for reissue filed May 9, 1931. Serial No. 536,279.

This invention relates to improvements in means for protecting silverware from becoming tarnished by reason of contact with the atmospheric traces of sulphurated hydrogen or sulphur dioxide.

The primary object of this invention is the provision of a readily operable enclosure for silverware, having an access opening through which the silverware can readily be placed in and removed from the enclosure, means for giving access through the opening, means for sealing the access opening against the free entry of air through the access opening when the enclosure is closed, and tarnish preventive means enclosed in said enclosure.

A further object is to provide an efficient method of carrying the tarnish preventive means.

Other objects and advantageous features of this invention will become apparent from the following description taken in conjunction with the appended claims and the accompanying drawings in which:—

Figure 1:
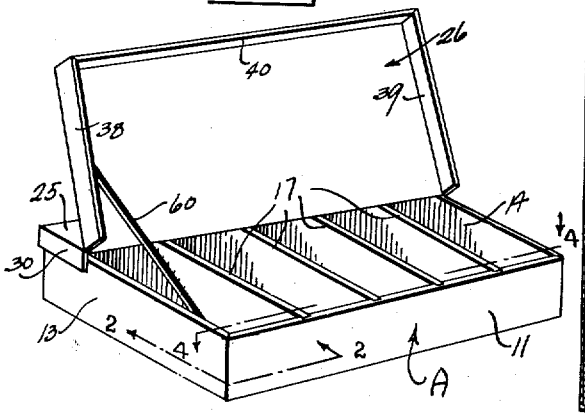
Figure 1 is a perspective view of the improved tarnish prevention case or container, showing the cover open and the compartments and sections exposed for receiving silverware.

In the drawings, wherein for the purpose of illustration is shown only a preferred embodiment of the invention, the letter A may generally designate the improved box or the container, which is constructed of inexpensive materials, and preferably of thin pieces of wood, laminated or otherwise. Preferably, the container includes a rectangular shaped bottom 10, having upstanding front and rear walls 11 and 12, and side walls 13 and 14, the edges of which may be suitably glued, bolted, or otherwise secured, either with edge abutting or mortice and tenon joints. The size of the container may vary, but for holding tableware, such as spoons, knives and forks, it is preferred to provide an anti-silver tarnish box having a series of compartments extending in parallelism with each other and with the side walls 13 and 14, with the lengths running from the front to the rear walls, as is shown in the drawings. The upstanding walls 11 to 14 inclusive are all of the same height, and the partition walls 17, of which any approved number may be provided, are of wood, or any other desired material, and are adapted to be morticed in the inner surfaces of the front and rear walls, at the ends thereof, as shown at 20 in Figure 2 of the drawings. The partition walls 17 have their lower edges resting on the bottom 10 and their upper edges flush with the top edges of the upstanding walls 11 to 14 inclusive.

The top of the box preferably includes a stationary rear section 25 and a cover 26 hinged to the section 25. The section 25, in length, extends from side wall 13 to side wall 14, and along its rear margin overlaps the top of the rear wall 12, and is secured thereto in any approved relation.

At the ends thereof it may be secured to the tops of the side walls 13 and 14 in any approved relation. The closure 26 is hinged along the front edge of the top 25. This hinge edge is spaced from the rear wall 12 a distance preferably less than one-third the dimension of the box from the front wall to the rear wall. The stationary top portion 25 is preferably provided with depending side flanges 30 adapted to overlap the outer surfaces of the side walls 13 and 14, to present a finished appearance.

Figure 3:
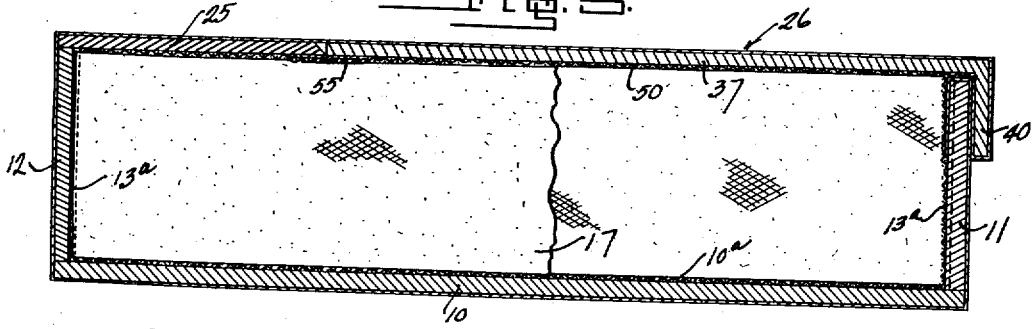
Figure 3 is a sectional view taken transversely of the case from front to rear thereof, with the cover closed.

The closure 26 is of wood, of the same thickness as the other walls of the body, and it includes the body portion 37 having side flanges 38 and 39 adapted to respectively overlap the outer surfaces of the side walls 13 and 14, and the front flange 40 adapted to exteriorly overlap the front wall 11, as shown in Figure 3 of the drawings. The closure 26 at its rear margin is hinged to the stationary top portion 25, as will be subsequently mentioned.

Figure 2:
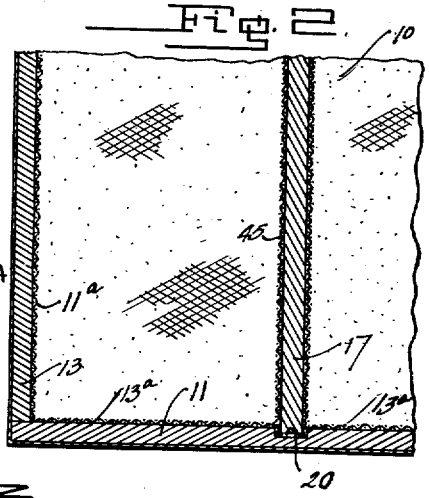
Figures 2 and 4 are sectional views taken substantially on their respective lines in Figure 1 of the drawings.
Figure 5:
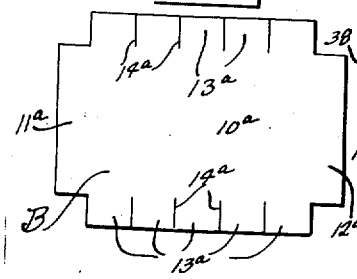
Figure 5 is a view showing the liner for the container or box, preferably of felt or some other flexible material which may be impregnated or coated with a chemical designed to prevent the tarnishing of silver.

The entire surfacing within the compartments and sections of compartments of the container are lined with some yieldable surfacing, such as felt, fabric, or anything that will not mar silver by coming in contact therewith, and which may support the tarnish prevention chemical. It is preferred to use some flannel material, and a piece is cut as shown at B in Figure 5 of the drawings, which includes the body portion $10^a$ having side flaps $11^a$ and $12^a$ at opposite sides thereof and at the front and rear ends thereof including flaps which are divided into sections $13^a$ by means of slit lines $14^a$ extending from the outer edges thereof. This material B is placed in the box body prior to the assembling of the partitions 17 therein, and it is apparent that the side flaps $11^a$ and $12^a$ cover the inner surfaces of the side walls 13 and 14, with the body $10^a$ covering the inner surface of the bottom 10, as shown in the drawing. The division lines $14^a$ for the flap sections $13^a$, of course, fall along the morticed recesses wherein the ends of the partition walls are received, as is shown in Figure 2. Thus, the entire inner surfaces of the side walls, front and rear walls and bottom, are covered with the fabric, flannel-like material B.

Figure 4:
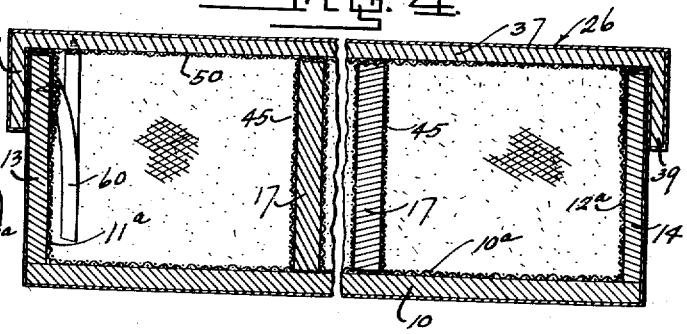

The partitions 17 are wrapped with the flannel-like material by means of individual flannel or fabric sections 45, which cover the opposite sides of said partitions, from end to end, and overlap the upper edges thereof, so that the inside surface of the cover when closed may abut the lining material of said partition walls, to seal off the individual compartments from each other, as is shown in Figure 4.

A piece of the fabric material 50 is adhered to the under surfaces of the top 25 and closure 26, extending unbroken across the hinge connection of said parts. If desired, a little slack material may be left in the goods at the hinge connection of the closure 26, to permit the closure to readily open, without stretching the cloth to the breaking point.

The outer surfaces of all walls and the closure of the box, with the exception of the partition walls, may be covered with suitable surfacing, or fancy paper having suitable designs thereon. This paper material may also extend unbroken across the hinge of the closure 26, and if desired the closure 26 may be additionally hinged by a strip of flexible material extending longitudinally of the hinge joint and adhering to the under surface of the top 25 and closure 26, as has been designated at 55 in Figure 3 of the drawings.

The paper covering besides assisting in sealing the hinge joint also assists in sealing the body of the box against the entrance of the surrounding atmosphere when the box is closed.

It is apparent from the foregoing that all surfaces of the box facing the individual article receiving compartments are provided with the fabric or flannel-like material, so that there is no opportunity for any air to enter the compartment, when the closure is shut upon the box, except through the flannel-like surfacing or material. The fabric may be glued or otherwise suitably secured to the surfaces in the respective positions above designated, and it is to be noted that the morticed ends of the partition walls hold the flap sections $13^a$ in place in the morticed recesses, as shown in Figure 2.

To limit the open position of the closure 26, a movement limiting cord or other device 60 is provided, secured at its ends to a wall 13 and flange 38, as shown in Figures 1 and 4 of the drawings.

An outstanding feature of the invention is the coating, impregnating, or otherwise depositing upon the material which lines the compartment, of a chemical which will prevent the tarnishing of silver disposed in the individual compartments by neutralizing the sulphurated hydrogen or sulphur dioxide which may seek to enter said compartments. The preferred method of depositing the chemical on the surfacing of the compartment is to thoroughly spray the same with a solution of acetate of lead, preferably in the proportion of four pounds of acetate of lead to one gallon of water. The nature of the flannel-like fabric is such that the droplets adhere to the fibers exposed to the compartments, or to the pile or nap, so as to provide a coating within each compartment, which will arrest and neutralize any sulphurated hydrogen or sulphur dioxide tending to enter the compartments. Of course, any other well known chemical which will prevent tarnishing of silver, may be used in lieu of the above, and I have in mind such solutions as borax, caustic potash, and metallic zinc, hypo-sulphite of soda, ammonium carbonate and others. It has been demonstrated during my experiments, that surfaces with a fibrous texture, or a nap, such as felt, are the most effective when chemically treated to arrest traces of sulphurated hydrogen and sulphur dioxide which ordinarily cause tarnishing of silver.

In the use of the container, practically the only tarnishing gases which enter the container are carried in by the entering atmosphere when the container is opened for the removal or replacement of the silverware. As the tarnish neutralizing chemical present in the container has a much greater affinity for the tarnishing gases than the silver, these gases are quickly neutralized and prevented from attacking the silver. While the container remains closed it is sealed against the free entry of the atmosphere and the only tarnishing gases which might get in must pass through the impregnated lining and any which might enter in this way are neutralized even before they actually enter the compartments and are thus effectively prevented from tarnishing the silverware.

It is apparent that the invention is of outstanding importance, because silverware will be prevented from becoming tarnished and will retain its bright and usable condition. This saves silver-plating in the case of silver-plated ware, and is in line with the endeavor in the arts and trades lines to conserve precious metals.

Various changes in the shape of the container for receiving silverware may be made, it being contemplated by me to use a flexible case. However, the case as shown has been found by experiment to be the most efficient. With any approved case used for enclosing silverware I may employ any approved chemical which will prevent the tarnishing of the silverware, without departing from the spirit of the invention or the scope of the claims.

I claim:

1. As an article of manufacture a silverware container having closure means and a compartment arranged to completely enclose a piece of silverware with a fabric-like lining facing the compartment and having a sprayed on coating of a tarnish resisting chemical, said coating being applied to the inner surface only of the lining fabric.

2. As an article of manufacture a silverware storage case having a compartment arranged to completely enclose a piece of silverware with a fabric-like surface facing the compartment, the inner surface only of the fabric carrying acetate of lead.

3. In a case of the class described a receptacle having a compartment therein for receiving silverware, a closure for the compartment, the compartment facing surfaces of all walls of the case and the closure having a suitable yieldable material thereon which will prevent the scratching of silverware by rubbing thereagainst, the yielding material having a nap and a protecting chemical on the nap only of said yielding material and capable of combating the chemical action of sulphur fumes to prevent the tarnishing of silverware in said case.

4. In a silverware receiving case a receptacle body having a silverware receiving compartment therein, a top covering a portion of said compartment and normally stationary and rigid with the receptacle, a cover hinged to said top as a means of access to said receptacle body, the cover when shut entirely closing the compartment of the receptacle body, and a solution of a chemical capable of arresting tarnishing fumes, present in the atmosphere, sprayed upon the inner surface only of the compartment facing walls of the body capable of arresting traces of sulphuric fumes ever present in the atmosphere.

5. In a silverware receiving case a receptacle body having a silverware receiving compartment therein, a top covering a portion of said compartment and normally stationary and rigid with the receptacle, a cover hinged to said top as a means of access to said receptacle body, the cover when shut entirely closing the compartment of the receptacle body, a yieldable fabric lining on the compartment facing surfaces of the receptacle top and cover, the lining fabric having a nap, and a chemical deposited on the nap of the fabric only of said lining and consisting of a solution of acetate of lead.

6. In a silverware case a box-like body including a bottom, upstanding front, rear and side walls, a closure for the body, a yieldable lining on the compartment facing surfaces of the bottom and upstanding walls and closure, of a nature to prevent marring of silverware by contact therewith, the closure when shut providing a compartment which is well sealed, said compartment facing material on the walls, bottom and closure of the case having a nap on its inner surface, an anti-tarnish chemical on the nap only and capable of preventing the staining of silver by the usually present sulphuric fumes of the atmosphere.

7. In a silverware case the combination of a bottom, upstanding front, rear and side walls defining a compartment, a closure for said compartment, the closure, bottom and upstanding walls being formed of wood and having the compartment facing surfaces thereof lined with antisilverware marring material provided with an anti-tarnish chemical applied to the inner surfaces only of said lining material and said chemical capable of arresting the sulphur fumes ever present in the air which might seep through the walls and covering of the case.

8. In a silverware case the combination of a bottom, upstanding front, rear and side walls defining a compartment, a closure for said compartment, the closure, bottom and upstanding walls being formed of wood and having the compartment facing surfaces thereof lined with antisilverware marring material having a nap and provided with an anti-tarnish chemical thereon on the nap only capable of arresting the sulphur fumes ever present in the air which might seep through the walls and covering of the case, a plurality of partitions in the case subdividing the interior thereof into a plurality of individual silverware receiving compartments which are closed to each other when the closure is shut, said partitions being faced with similarly treated soft material.

9. In a silverware case a box-like body including a bottom, upstanding, front and rear and side walls, a plurality of partition walls secured at their ends to the upstanding walls and at their bottom edges against the bottom wall to define a plurality of compartments, the upper edges of said partitions lying substantially flush with the top edges of said front, rear and side walls, and a top construction for the box-like body including a closure which shuts to abut the tops of the upstanding and partition walls to entirely enclose each of said compartments and to entirely close the individual compartments with respect to each other, a soft fabric lining covering the surfaces of the walls facing and defining said individual compartments, and a sulphide neutralizing chemical carried by said lining, the chemical having been sprayed on the inner surface only thereof as and for the purpose specified.

10. In a silverware case a box-like body including a bottom, upstanding front and rear and side walls, a plurality of partition walls associated with the bottom and upstanding walls to define a plurality of compartments, the upper edges of said partitions lying substantially flush with the top edges of said front, rear and side walls, a fixed top extension over parts of said compartments along the rear wall from side wall to side wall and abutting the top edges of the partition wall and leaving exposed parts of said individual compartments from the front wall rearwardly, a closure hinged to said top extension in position to engage the top edges of said walls for entirely closing the compartments to each other and to the atmosphere, a soft fabric lining on the compartment facing surfaces, and acetate of lead sprayed on the inner surface only of the lining.

11. In a silverware receiving case, a receptacle body having a plurality of partition walls therein subdividing the same into a plurality of compartments, a top wall fixed with the receptacle and permanently covering portions of said compartments, and a cover movable upon the other portion of the top of the receptacle as a means of access to said compartments, the cover when shut entirely enclosing the compartments and engaging the tops of the partitions for closing said partitions off from each other, yieldable fabric lining on the compartment facing surfaces of the walls of each of said compartments, and a sulphide neutralizing chemical on the compartment exposed surfaces only of the fabric lining.

12. In a silverware reciving case, a receptacle body comprising a bottom and upstanding walls, partitions in the body sub-dividing the same into a plurality of compartments, a cover, means for applying the cover tightly upon the top of said body, yieldable fabric lining on the compartment facing surfaces of the body and partition walls and the cover, said yieldable fabric being placed to be compressed between the inside surface of the cover and the top edges of the partition walls to effectively seal off said compartments with respect to each other when the cover is in place, and a sulphide neutralizing chemical sprayed onto the compartment facing surfaces only of said yieldable fabric lining.

13. In a silverware case, a main body part having a susbtantially flat top edge, a fixed cover part for a portion of the body, an openable part hinged to said fixed part, means for sealing the joint between the hinged part and the fixed cover part and means for sealing the box between the hinged cover and the body against the free entry of air, a fabric lining in the box, the lining having a nap, and the nap only of the lining carrying a tarnish preventing chemical.

In testimony whereof, I have hereunto set my hand this 6th day of May, 1931.

GEORGE E. HERRING.